US012135273B2

United States Patent
Blandin et al.

(10) Patent No.: US 12,135,273 B2
(45) Date of Patent: Nov. 5, 2024

(54) METHOD FOR CHARACTERISING A PARTICLE ON THE BASIS OF A HOLOGRAM

(71) Applicants: COMMISSARIAT A L'ENERGIE ATOMIQUE ET AUX ENERGIES ALTERNATIVES, Paris (FR);
HORIBA ABX SAS, Montpellier (FR);
IPRASENSE SAS, Clapiers (FR)

(72) Inventors: Pierre Blandin, Grenoble (FR); Cédric Allier, Grenoble (FR); Olivier Cioni, Grenoble (FR); Lionel Herve, Grenoble (FR); Pierre Joly, Grenoble (FR); Jean-Marc Dinten, Grenoble (FR)

(73) Assignees: COMMISSARIAT A L'ENERGIE ATOMIQUE ET AUX ENERGIES ALTERNATIVES, Paris (FR);
HORIBA ABX SAS, Montpellier (FR);
IPRASENSE SAS, Clapiers (FR)

(*) Notice: Subject to any disclaimer, the term of this patent is extended or adjusted under 35 U.S.C. 154(b) by 159 days.

(21) Appl. No.: 17/414,801

(22) PCT Filed: Dec. 16, 2019

(86) PCT No.: PCT/FR2019/053096
§ 371 (c)(1),
(2) Date: Jun. 16, 2021

(87) PCT Pub. No.: WO2020/128282
PCT Pub. Date: Jun. 25, 2020

(65) Prior Publication Data
US 2022/0018756 A1 Jan. 20, 2022

(30) Foreign Application Priority Data
Dec. 18, 2018 (FR) ...................... 18 73260

(51) Int. Cl.
*G01N 15/1434* (2024.01)
*G03H 1/08* (2006.01)

(52) U.S. Cl.
CPC ....... *G01N 15/1434* (2013.01); *G03H 1/0866* (2013.01); *G01N 2015/1445* (2013.01); *G01N 2015/145* (2013.01)

(58) Field of Classification Search
None
See application file for complete search history.

(56) References Cited

U.S. PATENT DOCUMENTS

2007/0216906 A1* 9/2007 Javidi .................. G06V 20/695
356/457
2009/0044608 A1* 2/2009 Babcock ............... G01N 9/002
73/64.53

(Continued)

FOREIGN PATENT DOCUMENTS

WO WO-2017162985 A1 * 9/2017 ......... G01N 15/1429
WO WO 2018/115734 A1 6/2018
WO WO 2018/215337 A1 11/2018

OTHER PUBLICATIONS

Lee, Sang-Hyuk, et al. "Characterizing and tracking single colloidal particles with video holographic microscopy." Optics express 15.26 (2007): 18275-18282. (Year: 2007).*

(Continued)

*Primary Examiner* — Rufus L Phillips
(74) *Attorney, Agent, or Firm* — Oblon, McClelland, Maier & Neustadt, L.L.P.

(57) ABSTRACT

A method for characterizing a particle present in a sample, the sample lying between an image sensor and a light source and the sensor lying in a detection plane, includes illuminating the sample with the light source which emits an incident light wave propagating along a propagation axis, and acquiring an image of the sample with the sensor. The (Continued)

sensor is exposed to an exposure light wave. The image includes a plurality of elementary diffraction patterns each corresponding to one particle. The method also includes reconstructing a complex image representative of a complex amplitude of the light wave on a reconstruction surface passing through the sample, based on the acquired image; selecting a region of interest of the complex image corresponding to a particle of interest; forming an extracted image based on the region of interest; and characterizing the particle of interest depending on the extracted region of interest.

17 Claims, 6 Drawing Sheets

(56) References Cited

U.S. PATENT DOCUMENTS

| | | | |
|---|---|---|---|
| 2009/0063077 A1* | 3/2009 | Liu | G03F 7/70625 |
| | | | 702/82 |
| 2016/0370283 A1* | 12/2016 | Allier | G01N 15/1463 |
| 2019/0226972 A1* | 7/2019 | Javidi | G06T 7/62 |

OTHER PUBLICATIONS

International Search Report issued Mar. 10, 2020 in PCT/FR2019/053096 filed Dec. 16, 2019, 2 pages.

* cited by examiner

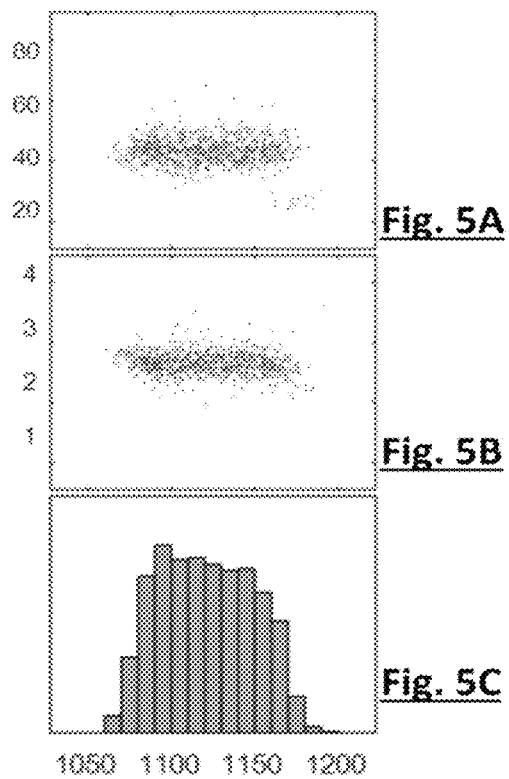
Fig. 5A
Fig. 5B
Fig. 5C
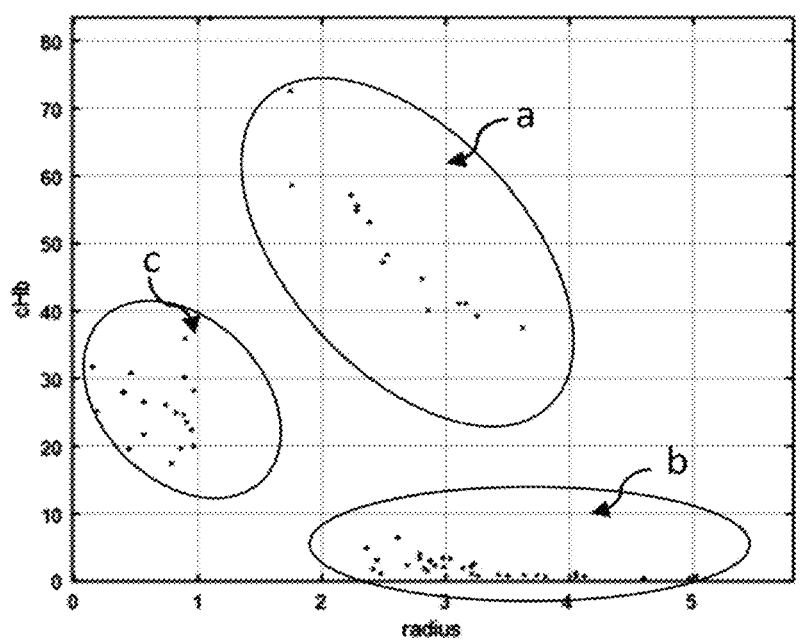
Fig. 5D

METHOD FOR CHARACTERISING A PARTICLE ON THE BASIS OF A HOLOGRAM

TECHNICAL FIELD

The technical field of the invention is the characterization of particles, biological particles for example, on the basis of an image.

PRIOR ART

Holographic imaging has made, over the last few years, substantial progress, in particular as regards the field of sample analysis. A high number of applications, to the characterization of samples and in particular samples intended for applications in biology or for diagnostic purposes, have been described. Many publications relate, for example, to samples containing particles, the objective being to characterize the particles.

In one widespread configuration, the image of the sample may be acquired in a lensless imaging configuration, no imaging optic being placed between the sample and the image sensor. In the image acquired by the image sensor, each particle produces a diffraction pattern, the latter being a signature of the particle. Document WO2008090330 describes such a configuration, when the source used is a light-emitting diode. In this document, it is demonstrated that this imaging modality results in a large field of observation, and allows cells or bacteria to be rapidly identified using a simple device.

Document U.S. Pat. No. 7,465,560 describes a device allowing bacterial colonies to be identified depending on a diffraction pattern formed on an image sensor. In this document, the examined bacterial colony is illuminated with a laser beam. This document shows that a diffraction pattern forms a signature of a bacterial colony. A diffraction pattern may be subjected to a classification, for example one based on a decomposition into Zernike polynomials. This is for example described in U.S. Pat. No. 8,787,633 or in WO2014184390.

The image acquired by the image sensor may be subjected to a reconstruction, referred to as the holographic reconstruction, allowing a clearer image of the particles to be obtained. Sophisticated holographic propagation algorithms, allowing an image, referred to as the reconstructed image, of the sample to be obtained, are described in WO2016189257 or in WO2017162985.

The application of such algorithms may allow a complex image of the sample to be obtained. The latter may be subjected to a segmentation, for particle counting purposes, as described in WO2018115734. By forming a plurality of complex images of the sample, it is possible to establish profiles parallel to the propagation axis of the light, with a view to particle characterization. This is for example described in WO2018215337.

A difficulty may arise when the sample contains a high concentration of particles. Specifically, in the image acquired by the image sensor, the diffraction patterns corresponding to each particle, respectively, may superpose. As a result, a characterization of the particles, on the basis of their respective diffraction patterns, becomes more difficult to implement.

The inventors have sought to improve the methods described above, so as to allow particles to be characterized on the basis of the diffraction pattern associated with each thereof. The method is particularly suitable for a sample in which, due to the density of the particles, the diffraction patterns associated with each thereof are superposed.

SUMMARY OF THE INVENTION

A first subject of the invention is a method for characterizing a particle present in a sample, the sample lying between an image sensor and a light source, the image sensor lying in a detection plane, the method comprising the following steps:
  a) illuminating the sample with the light source, the light source emitting an incident light wave that propagates along a propagation axis;
  b) acquiring an image of the sample with the image sensor, the image sensor being exposed to an exposure light wave, the image comprising a plurality of elementary diffraction patterns, each elementary diffraction pattern corresponding to one particle;
  c) on the basis of the acquired image, reconstructing a complex image representative of a complex amplitude of the exposure light wave on at least one reconstruction surface passing, preferably, through the sample, this reconstruction being achieved by implementing an iterative reconstruction algorithm, the algorithm comprising, in each iteration, updating a phase of the exposure light wave in the detection plane or on the reconstruction surface;
  d) selecting a region of interest of the complex image, the selected region of interest corresponding to a particle of interest;
  e) forming an extracted complex image on the basis the region of interest selected in step d);
  f) applying a propagation operator to the extracted complex image formed in step e), so as to obtain, in a propagation plane, an elementary diffraction pattern of the particle selected in step c), such that the elementary diffraction pattern obtained is isolated from elementary diffraction patterns of other particles present in the sample;
  g) characterizing the particle of interest depending on the elementary diffraction pattern resulting from step f).

In step f), the elementary diffraction pattern may take the form of a complex image. It is then possible to obtain a representation of the elementary pattern, by considering the modulus or the phase of the complex image, or even its real part or its imaginary part.

In step f), the propagation plane may be the detection plane. However, it may also be a plane located at a smaller or larger distance from the sample than the distance between the sample and the detection plane.

According to one embodiment,
  step c) comprises, in each iteration, applying a holographic propagation operator to an image of the exposure light wave, in the detection plane, so as to obtain a complex expression for the exposure light wave, in at least one plane in which the sample lies, forming the complex image;
  step d) comprises, on the basis of the reconstructed complex image, obtaining an observation image, the particle of interest being selected in the observation image.

Step f) may comprise applying a holographic propagation operator to the region of interest selected in step e), so as to obtain the elementary diffraction pattern, corresponding to the particle of interest, in the propagation plane, the portion, of the reconstructed complex image, located outside the region of interest not being propagated.

The method may comprise an estimation of a distance between the particle of interest and the detection plane, such that, in step f), the propagation operator takes into account the distance thus estimated.

In step f), the propagation is carried out in light of a predetermined propagation distance.

According to one embodiment, in step f), a complex elementary diffraction pattern is obtained, in the reconstruction plane, of the particle selected in step c). In step g), the characterization is then carried out on the basis of the phase or of the modulus of the complex elementary diffraction pattern, or of its real part or of its imaginary part.

Step g) may comprise determining an axial profile, representing a radial average of the elementary diffraction pattern.

Step g) may comprise:
comparing the elementary diffraction pattern, obtained in step f), with at least one diffraction pattern corresponding to a known particle;
or comparing the elementary diffraction pattern, obtained in step f), with at least one diffraction pattern modeled in light of a particle the refractive index and/or size of which are known;
or classifying the elementary diffraction pattern, obtained in step f), in light of diffraction patterns obtained using known particles, or diffraction patterns modeled in a training phase.

According to one embodiment,
step g) comprises decomposing the elementary diffraction pattern into a basis of Zernike polynomials, so as to obtain coordinates of the elementary diffraction pattern in the basis;
the particle of interest being characterized depending on the coordinates of the elementary detection pattern.

In step g), the characterization may be carried out depending on modeled diffraction patterns, each diffraction pattern corresponding to one particle a parameter of which is known, the parameter being a size and/or a refractive index, the characterization aiming to determine a value of the parameter for the analyzed particle of interest. The modeling may notably be based on an assumption that the particle is spherical.

The method may comprise iteratively adjusting the parameter of the particle, each iteration comprising:
i) taking into account a parameter or a set of parameters of the particle;
ii) obtaining a modeled diffraction pattern dependent on the parameter or the set of parameters taken into account;
iii) determining a difference between the modeled diffraction pattern and the elementary diffraction pattern resulting from step f);
iv) estimating a parameter, or a set of parameters, aiming to decrease the difference thus determined, the parameter or set of parameters estimated being taken into account in the following iteration.

According to one embodiment, in steps i) to iv), a set of parameters is taken into account, the set of parameters comprising a distance between the particle and the detection plane.

A second subject of the invention is a device for observing a sample, the sample comprising particles, the device comprising:
a light source, configured to illuminate the sample;
a sample holder, configured to receive the sample;
an image sensor, placed such that when the sample is placed on the holder, it lies between the image sensor and the light source, the image sensor being configured to acquire an image of the sample;
a processor, configured to implement steps c) to f) or c) to g) of a method according to the first subject of the invention, on the basis of an image acquired by the image sensor.

According to one embodiment, no image-forming optic is placed between the image sensor and the processor.

According to one embodiment, the device comprises an optical system lying between the sample and the image sensor, the optical system defining an image plane and an object plane, the device comprising means for adjusting the optical system, or the sample, or the image sensor, such that:
the detection plane is offset from the image plane;
and/or the object plane is offset from a sample plane in which the sample lies.

Other advantages and features will become more clearly apparent from the description that follows of particular embodiments of the invention, which are given by way of non-limiting example, and shown in the figures listed below.

FIGURES

FIG. 5A illustrates results of trials carried out on a sample containing blood particles.

FIG. 5B illustrates results of trials carried out on a sample containing blood particles.

FIG. 5C illustrates results of trials carried out on a sample containing blood particles.

FIG. 5D illustrates results of trials carried out on a sample containing blood particles.

DESCRIPTION OF SPECIFIC EMBODIMENTS

Figure 1:
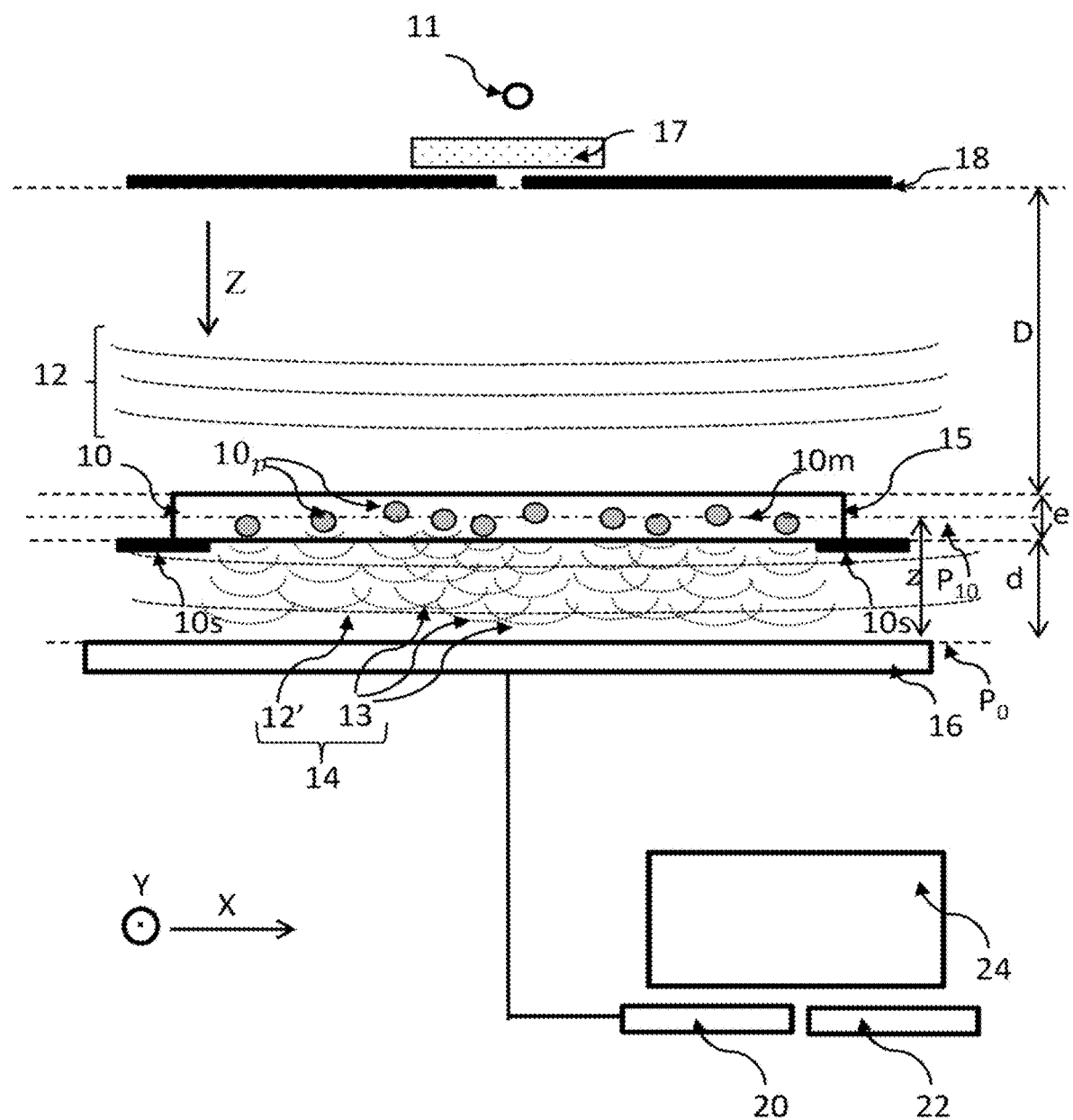
FIG. 1 shows a first device allowing the invention to be implemented.

FIG. 1 shows an example of a device according to the invention. A light source 11 is configured to emit a light wave 12, referred to as the incident light wave, that propagates in the direction of a sample 10, along a propagation axis Z. The light wave is emitted in an illumination spectral band Δλ.

The sample 10 is a sample that it is desired to characterize. It notably comprises a medium $10m$ in which particles $10_p$ bathe. The medium $10m$ may be a liquid medium. It may comprise a bodily fluid, obtained for example from blood or urine or lymph or cerebrospinal fluid. It may also be a culture medium, comprising nutrients allowing microorganisms or cells to develop. By particle, what is notably meant is, non-exhaustively:
- a cell, whether it be a cultured cell or a body cell (a blood cell for example);
- a microorganism, for example a bacterium or a yeast or a microalga;
- a solid particle, for example a microbead, the microbead possibly being functionalized, so as to promote grafting with an analyte;
- a particle forming an emulsion in the medium $10m$, in particular a particle that is insoluble in the medium $10m$, an example being a lipid droplet in an aqueous medium.

A particle $10_p$ may be solid or liquid. The invention more particularly relates to particles the size of which is smaller than 1 mm, or even than 100 µm, or even than 50 µm. By particle size, what is meant is a diameter or a diagonal.

By to characterize, what is notably meant is:
- to determine the nature of a particle, i.e. to classify this particle among one or more predetermined classes;
- to determine the state of a particle, among one or more predetermined states;
- to estimate a size of a particle, or its shape, or its volume or any other geometric parameter;
- to estimate an optical property of one or more particles, for example the refractive index or an optical transmission-related property, or an optical thickness (product of thickness and refractive index);
- the method may also comprise counting particles depending on their characterization.

The sample 10 is, in this example, contained in a fluidic chamber 15. The fluidic chamber 15 is for example a fluidic chamber of the Countess or Cellvision or Gene Frame® type of thickness e=100 µm. The thickness e of the sample 10, along the propagation axis, typically varies between 10 µm and 1 cm, and is preferably comprised between 20 µm and 500 µm. The sample lies in a plane $P_{10}$, called the plane of the sample, perpendicular to the propagation axis Z. The plane of the sample is defined by the X- and Y-axes shown in FIG. 1. The sample is held on a holder 10 s at a distance d from an image sensor 16. The concentration of particles may vary between 50 per microliter and 100000 per microliter.

The distance D between the light source 11 and the fluidic chamber 15 is preferably larger than 1 cm. It is preferably comprised between 2 and 30 cm. Advantageously, the light source 11, seen by the sample, may be considered to be point-like. This means that its diameter (or its diagonal) is preferably smaller than one tenth, and better still one hundredth of the distance between the fluidic chamber 15 and the light source. In FIG. 1, the light source is a light-emitting diode. It is generally associated with a diaphragm 18, or spatial filter. The aperture of the diaphragm is typically comprised between 5 µm and 1 mm, and preferably between 50 µm and 500 µm. In this example, the diaphragm is supplied by Thorlabs under the reference P150S and its diameter is 150 µm. The diaphragm may be replaced by an optical fiber, a first end of which is placed facing the light source 11 and a second end of which is placed facing the sample 10. The device shown in FIG. 1 also comprises a diffuser 17, placed between the light source 11 and the diaphragm 18. The use of such a diffuser allows constraints of the centrality of the light source 11 with respect to the aperture of the diaphragm 18 to be relaxed. The function of such a diffuser is to distribute the light beam produced by an elementary light source 11 over a cone of angle α. The use of such a diffuser is described in WO2016078946. Preferably, the scattering angle α varies between 10° and 80°. Alternatively, the light source may be a laser source, such as a laser diode. In this case, it is not useful to associate a spatial filter or a diffuser therewith. When the light source is a laser source, it is advantageously used as described in patent application WO2017109428.

Preferably, the emission spectral band $\Delta\lambda$ of the incident light wave 12 has a width smaller than 100 nm, or even smaller than 50 nm. By width of the spectral band, what is meant is the full width at half maximum of said spectral band.

The sample 10 is placed between the light source 11 and the aforementioned image sensor 16. The image sensor 16 defines a detection plane $P_0$, which preferably lies parallel, or substantially parallel, to the plane $P_{10}$ in which the sample lies. The term substantially parallel means that the two elements may not be rigorously parallel, an angular tolerance of a few degrees, lower than 20° or 10° being acceptable.

The image sensor 16 is able to form an image $I_0$ of the sample 10 in the detection plane $P_0$. In the example shown, the image sensor 16 is an image sensor comprising a matrix array of CCD or CMOS pixels. The detection plane $P_0$ preferably lies perpendicular to the propagation axis Z of the incident light wave 12. The distance d between the sample 10 and the matrix array of pixels of the image sensor 16 is preferably comprised between 50 µm and 2 cm, and more preferably comprised between 100 µm and 2 mm.

The absence in this embodiment of any magnifying or image-forming optic between the image sensor 16 and the sample 10 will be noted. This does not prevent focusing microlenses from optionally being present on each pixel of the image sensor 16, the function of said lenses not being to magnify the image acquired by the image sensor, their function rather being to optimize detection efficiency.

As mentioned in the patent applications cited with respect to the prior art, under the effect of the incident light wave 12, the particles $10_p$ present in the sample may generate a diffracted wave 13, which is liable to generate, in the detection plane $P_0$, interference, in particular with a portion 12' of the incident light wave 12 transmitted by the sample. Moreover, the sample may absorb a portion of the incident light wave 12. Thus, the light wave 14 transmitted by the sample and to which the image sensor 16 is exposed, which wave is designated by the term "exposure wave", may comprise:
- a component 13 resulting from the diffraction of the incident light wave 12 by each particle of the sample;
- a component 12' resulting from the transmission of the incident light wave 12 by the sample, a portion of the latter possibly being absorbed in the sample.

These components interfere in the detection plane. Thus, the image acquired by the image sensor contains interference patterns (or diffraction patterns), each interference pattern being able to be associated with one particle $10_p$ of the sample.

A processor 20, a microprocessor for example, is able to process each image $I_0$ acquired by the image sensor 16. In particular, the processor is a microprocessor connected to a programmable memory 22 in which is stored a sequence of instructions for performing the image-processing and computing operations described in this description. The processor may be coupled to a screen 24 allowing the images acquired by the image sensor 16 or computed by the processor 20 to be displayed.

When the interference patterns are sufficiently distant from one another, each interference pattern is able to allow the particle with which it is associated to be characterized. This is described in the documents U.S. Pat. No. 8,787,633 and WO2014184390 cited with respect to the prior art. However, when the quantity of particles present in the sample is large, the interference patterns superpose, this no longer allowing a correct characterization to be achieved by implementing the methods of the prior art.

Figure 2:
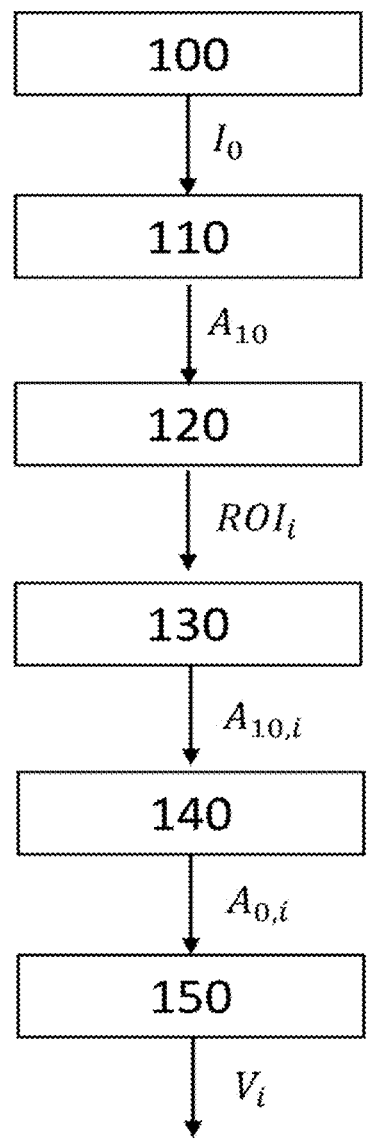
FIG. 2 shows the main steps of a method implementing the invention.

The inventors have devised a method that is particularly suited to the situation in which the elementary diffraction patterns of each particle superpose. The main steps of the method are illustrated in FIG. 2. These steps are described with reference to FIGS. 3A to 3F. These figures were obtained using a blood sample purified with dextran. The effect of the dextran was to cause an aggregation of red blood cells, this leading to sedimentation of the latter. The supernatant plasma, which was depleted in red blood cells with respect to the initial blood, was collected. It was then diluted in a PBS buffer (PBS being the acronym of Phosphate Buffer Saline) at physiological pH. The experimental conditions were the following light source: 405 nm laser source;
image sensor: IDS LA-1924LE CMOS sensor comprising 3840 by 2748 pixels, the size of each pixel being 1.67 µm×1.67 µm, providing an effective detection area of about 30 mm$^2$;
distance between the sample and the image sensor: between 1 mm and 1.5 mm.

Figure 3A:
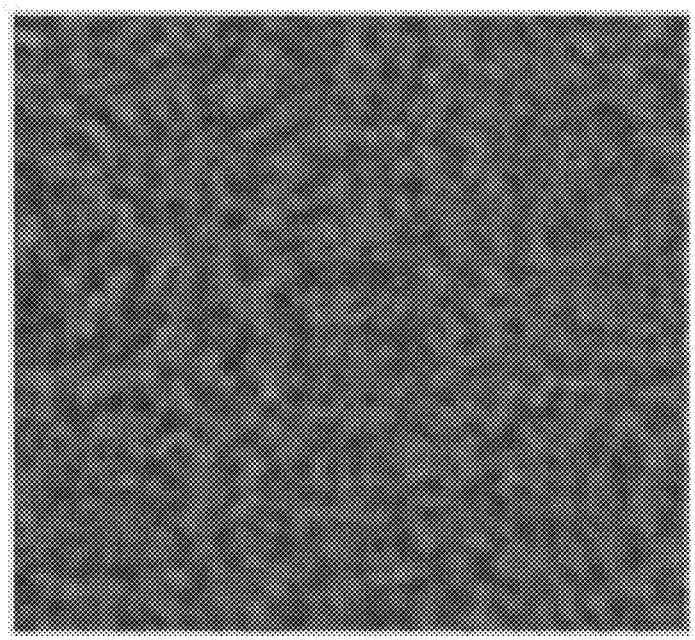
FIG. 3A is an example of an image acquired by the sensor.

Step 100: acquisition of the image $I_0$ by the image sensor. The image $I_0$ contains various elementary diffraction patterns that are superposed on one another. FIG. 3A shows such an image. Obviously, the methods for characterizing diffraction patterns disclosed in the documents of the prior art are not applicable, due to the density of the particles in the sample being too high.

Step 110: reconstruction of a complex image $A_{10}$ in the sample plane. On the basis of the image $I_0$ obtained in step 100, a holographic reconstruction algorithm is used to obtain a complex image $A_{10}$, preferably in a reconstruction plan Rio in which the sample lies. The complex image $A_{10}$ corresponds to a complex expression of the exposure light wave 14 in the reconstruction plane in question. This step may notably implement an iterative algorithm as described in WO2017162985, and more precisely in steps 110 to 150 described in that patent application.

During the implementation of this iterative algorithm, in each iteration, the acquired image, or an image resulting from a previous iteration, is propagated to the reconstruction plane, in this case the plane of the sample. A complex image propagated to the plane of the sample is thus obtained. A noise level in the reconstructed complex image is then determined, then a complex image is adjusted, in the plane of the sample, allowing the noise level in the complex image propagated to the plane of the sample to be reduced. The adjustment is carried out so as to minimize a criterion quantifying a noise level in the complex image propagated to the plane of the sample. The adjustment notably consists in adjusting the phase of the exposure light wave in the plane of the sample. The complex image estimated in the detection plane, in each iteration, is used, i.e. propagated to the sample plane, in the following iteration. The inventors have observed that the implementation of such an iterative algorithm leads to particularly advantageous results.

Alternatively, an iterative algorithm as described in WO2016189257 may be employed. Such an algorithm assumes that an image of the sample is formed in a plurality of spectral bands.

In such algorithms, the phase of the exposure light wave 14 is gradually adjusted in the detection plane. In WO2016189257, the phase is adjusted iteratively by averaging, in each iteration, the phase of light waves reconstructed in the plane of the sample, in various spectral bands. In WO2017162985, the phase is adjusted iteratively so as to minimize, in each iteration, the reconstruction noise of a complex image reconstructed in the plane of the sample.

Following the implementation of the holographic reconstruction algorithm, an image $I_{10}$, referred to as the observation image of the sample, may be obtained from the reconstructed complex image $A_{10}$. The observation image $I_{10}$ is an image that allows the reconstructed complex image $A_{10}$ to be visually represented. It may be a question:

of an image of the modulus of the reconstructed complex image: $I_{10}=\text{mod}(A_{10})$, mod designating the modulus operator;

or of an image of the phase of the reconstructed complex image: $I_{10}=\arg(A_{10})$, arg designating the argument operator;

or of an image of the real part of the reconstructed complex image: $I_{10}=\text{Re}(A_{10})$, Re designating an operator that returns the real part;

or of an image of the imaginary part of the reconstructed complex image: $I_{10}=\text{Im}(A_{10})$, Im designating an operator that returns the imaginary part;

or a combination of the aforementioned images.

Generally, an observation image is an image formed from scalar quantities obtained from a complex image, the latter being formed from complex quantities.

Figure 3B:
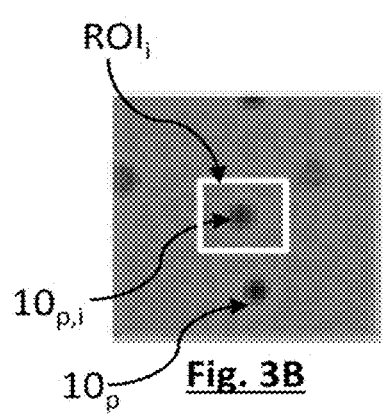
FIG. 3B is an image of the modulus of a complex image reconstructed, in a plane in which the sample lies, from the image acquired by the sensor.
Figure 3C:
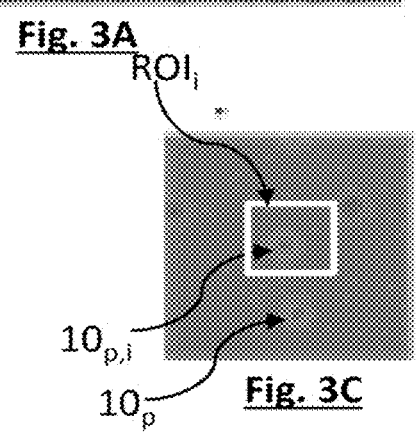
FIG. 3C is an image of the phase of a complex image reconstructed, in a plane in which the sample lies, from the image acquired by the sensor.

FIGS. 3B and 3C show an observation image $I_{10}$ corresponding to the modulus and phase of one portion of a complex image $A_{10}$ reconstructed, in the plane of the sample, on the basis of the hologram shown in FIG. 3A, respectively. The observation image $I_{10}$ of FIG. 3B, which was obtained using the modulus of the reconstructed complex image, allows each particle to be separated from the others. It allows a particle of interest $10_{p,i}$ that it is desired to characterize to be selected.

Step 120: selection of a region of interest $ROI_i$, corresponding to the particle of interest $10_{p,i}$.

One advantage of the observation image $I_{10}$ is that it is obtained from a complex image $A_{10}$ reconstructed in a reconstruction plane $P_{10}$ passing through the sample 10. The spatial resolution of the observation image $I_{10}$ allows particles $10_p$ to be easily separated from one another. Using the observation image $I_{10}$, a user is able to select a particle. The selection may also be performed by a microprocessor, using an image-segmentation algorithm, so as to isolate regions of interest from the background of the image. The segmentation may be carried out by thresholding, for example Otsu's thresholding or Bradley thresholding. The region of interest $ROI_i$ then corresponds to a particle, or to a group of particles that are so close together as to form the same signature in the reconstructed complex image, the latter case notably corresponding to the formation of a bacterial colony.

At the end of step 120, a region of interest $ROI_i$ of the observation image $I_{10}$, which corresponds to a particle of interest $10_{p,i}$ that it is desired to characterize, is obtained. The region of interest $ROI_i$ may also be applied to the reconstructed complex image $A_{10}$, so as to extract, from this image, only the region of interest corresponding to the particle of interest $10_{p,i}$.

Preferably, the region of interest $ROI_i$ is centered on the particle of interest $10_{p,i}$, or on the group of particles in question.

Step 130

Figure 3D:
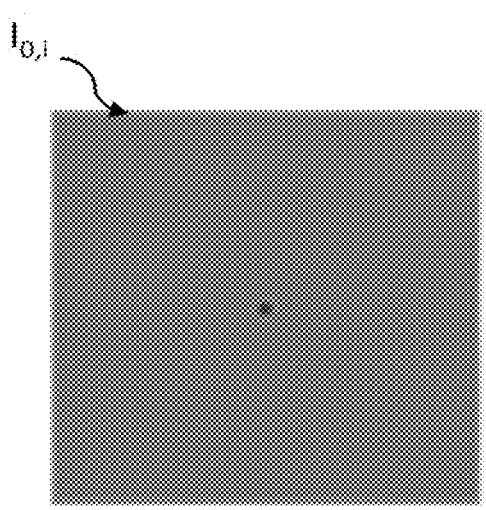
FIG. 3D is an image of the modulus of a complex image extracted from a region of interest, corresponding to a particle of interest, of the reconstructed complex image.
Figure 3E:
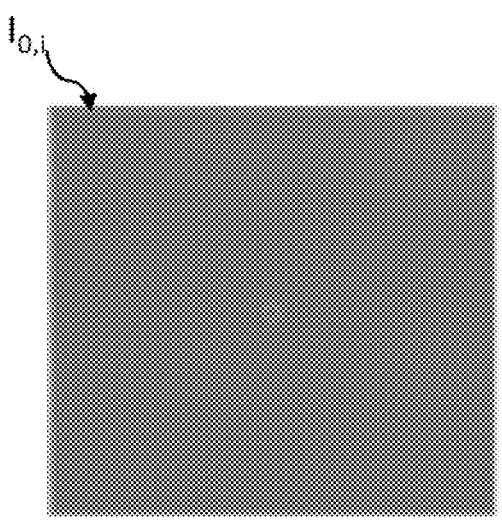
FIG. 3E is an image of the phase of a complex image extracted from a region of interest, corresponding to a particle of interest, of the reconstructed complex image.

Extraction of a portion of the complex image located in the region of interest $ROI_i$ selected in step 120, so as to obtain an extracted complex image $A_{10,i}$. The portion of the image thus extracted forms a detail. FIGS. 3D and 3E show the modulus $\text{mod}(A_{10,i})$ and phase $\arg(A_{10,i})$ of the extracted complex image $A_{10i}$, respectively. In these figures, the extracted complex image comprises the region of interest $ROI_i$ of the reconstructed complex image $A_{10}$. The pixels arranged around the region of interest are representative of an average background level of the reconstructed complex image $A_{10}$. Alternatively, the pixels of the extracted complex image $A_{10,i}$ that are located around the region of interest $ROI_i$ may be set to an arbitrary value, for example a grayscale level equal to 1.

Step 140

Propagation, to a propagation plane, of the extracted complex image $A_{10,i}$. The propagation plane may notably be the detection plane, this case being considered below. However, this is not essential. The propagation plane, to which the extracted complex image is propagated, may be different from the detection plane. The region of interest $ROI_i$ is extracted from a complex image $A_{10}$ obtained using a holographic reconstruction algorithm comprising a gradual adjustment of the phase of the exposure light wave. It may therefore be assumed that, in the extracted region of interest, the value of the phase will have been estimated correctly. Thus, the exposure light wave 14 is correctly described in the extracted region of interest $ROI_i$. The region of interest $ROI_i$ may then be propagated simply by using a holographic propagation operator h, such operators being known in the field of holography, and for example a Fresnel operator, such as:

$$h(x, y, z) = \frac{1}{j\lambda z} e^{j2\pi \frac{z}{\lambda}} \exp\left(j\pi \frac{x^2 + y^2}{\lambda z}\right) \quad (1)$$

where x, y designate coordinates in the detection plane $P_0$; and where z is a coordinate along the propagation axis Z.

The propagation may comprise a convolution of the extracted complex image, containing the region of interest $ROI_i$, and of the propagation operator h, such that:

$$A_{0,i}(x,y,z) = A_{10,i}(x,y,z) * h$$

where:

$A_{0,i}$ is the elementary diffraction pattern obtained in the detection plane $P_0$;

$A_{10,i}$ is the complex image, containing the region of interest $ROI_i$, extracted from the reconstructed complex image $A_{10}$.

In this step, only the region of interest $ROI_i$ of the complex image $A_{10}$ is propagated to the propagation plane (in this example the propagation plane), so as to obtain an elementary diffraction pattern corresponding to the particle of interest isolated from the other particles.

This step allows an image representing the elementary diffraction pattern $A_{0,i}$ corresponding to the particle of interest $10_{p,i}$ to be obtained without this figure being superposed on the diffraction patterns corresponding to the other particles $10_p$ of the sample, in particular the particles located in the vicinity of the particle of interest $10_{p,i}$. One elementary diffraction pattern is obtained, this allowing a more reliable characterization of the particle of interest $10_{p,i}$. The elementary diffraction pattern $A_{10,i}$ is a complex image, i.e. one formed from complex amplitudes, from which the modulus, or phase, or real part, or imaginary part may be extracted, so as to obtain an observation diffraction pattern $I_{0,i}$.

Figure 3F:
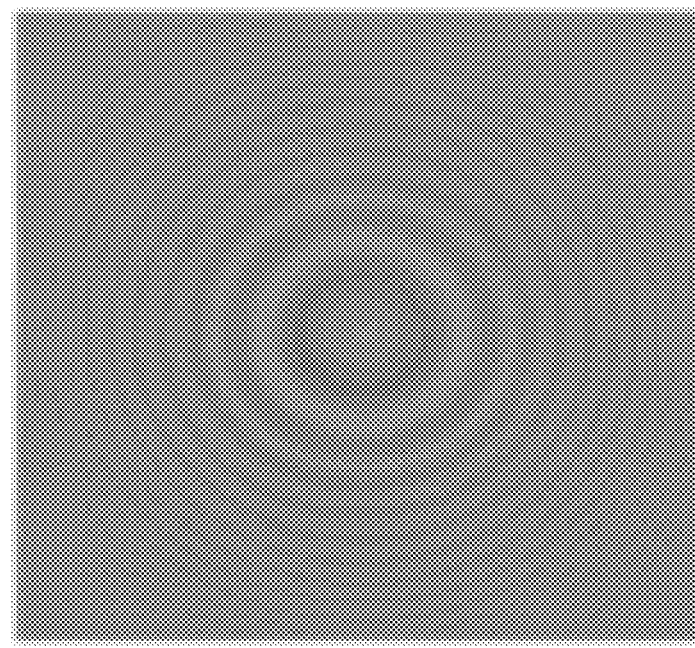
FIG. 3F shows an image of the modulus of a diffraction pattern propagated from the extracted complex image.

FIG. 3F is an observation diffraction pattern $I_{0,i}$ obtained from the modulus of an elementary diffraction pattern $A_{0,i}$, the latter being obtained by propagating the extracted complex image $A_{10,i}$ shown in FIGS. 3D and 3E to the propagation plane, which in this example is the detection plane.

The particles are not necessarily coplanar. Thus, according to one embodiment, in step 110, a plurality of observation images $I_{10,z}$ are formed, each observation image being associated with one reconstruction distance z with respect to the detection plane $P_0$. Each observation image $I_{10,z}$ results from a complex image $A_{10,z}$ obtained by implementing an iterative holographic reconstruction algorithm on the image $I_0$ formed in the detection plane $P_0$. The difference between two successive reconstruction distances z may be comprised between a few μm and a few tens of μm. For each particle of interest $10_{p,i}$ a distance $z_i$ with respect to the detection plan may be determined. The distance $z_i$ may be determined via digital focusing, which consists in determining the distance at which the signature of the particle of interest $10_{p,i}$, in the various observation images $I_{10,z}$, is the sharpest. According to this embodiment, the region of interest $ROI_i$ corresponding to each particle of interest $10_{p,i}$ is extracted from the observation image $I_{10,z_i}$ formed at the distance $z_i$ associated with the particle.

In step 140, the propagation of the region of interest $ROI_i$ then takes into account, via the propagation operator, the propagation distance $z_i$ associated with the particle of interest $10_{p,i}$.

Alternatively, whatever the distance $z_i$ associated with the particle of interest $10_{p,i}$, the extracted complex image is propagated using a constant and predetermined propagation distance. Thus, depending on the distance $z_i$ associated therewith, the particles of interest $10_{p,i}$ are propagated to different propagation planes.

The invention thus allows, for each particle of interest $10_{p,i}$ an elementary diffraction pattern $A_{0,i}$ that takes into account the distance $z_i$ between the particle of interest and the detection plane $P_0$ to be formed.

Step 150. Characterization

In this step, the particle of interest $10_{p,i}$ is characterized using the elementary diffraction pattern $A_{0,i}$ resulting from step 140.

The particle of interest $10_{p,i}$ is characterized on the basis of diffraction patterns corresponding to known particles, these either being modeled or acquired experimentally.

The characterization may consist in a classification of the particle of interest $10_{p,i}$ among predetermined particle classes. The classification may assume a training phase has been carried out using one or more training samples containing known particles.

The characterization may make use of deep-learning techniques.

According to one embodiment, a classification assuming a reduction in the dimensionality of the elementary diffraction pattern $A_{0,i}$ is carried out.

Figure 4:
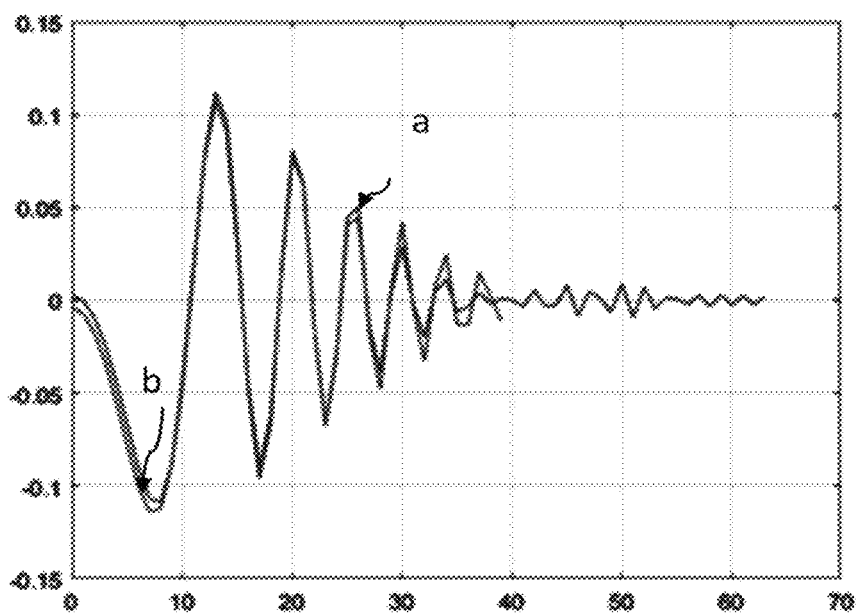
FIG. 4 shows an example of a radial average representative of the modulus of a diffraction pattern.

A first solution is to take a radial average of the elementary diffraction pattern, the modulus or the phase of the diffraction pattern for example being considered. This solution is particularly suitable for spherical objects. Specifically, each diffraction pattern has a certain symmetry about a center of the diffraction pattern. It is possible to describe the diffraction pattern via radial averaging, consisting in taking an average of the value of the pixels located at the same distance from the center of the diffraction pattern. FIG. 4 represents such a radial average (curve a), obtained considering the modulus of the elementary diffraction pattern. The radial average takes the form of an intensity profile measured in the detection plane, transversely to the elementary diffraction pattern, and passing through the center of the latter. In FIG. 4, the brace shows the portion of the radial average that has sufficient signal-to-noise ratio and spatial sampling pitch to be able to be used to characterize the particle of interest. The use of the radial average allows information present in the elementary diffraction pattern to be expressed in the form of a function, the variable r of which is the distance with respect to the center of the diffraction pattern. The variable r corresponds to the x-axis in FIG. 4.

Another solution is to project an observation image resulting from the elementary diffraction pattern $A_{0,i}$ into a basis of Zernike polynomials. In this case, the elementary diffraction pattern is decomposed into a predetermined number of Zernike polynomials $Z_n^m$ n being an integer corresponding to the order of the polynomial, m being an integer such that m<n and such that n−m is even.

Zernike polynomials are known to those skilled in the art, and their use has been described in U.S. Pat. No. 8,787,633 or in WO2014184390. It is possible for example to obtain, from the elementary diffraction pattern $A_{0,i}$, two observation images representing the modulus and the phase of the elementary diffraction pattern, respectively. Each image is decomposed into the first 15 Zernike polynomials $Z_0^0, Z_1^{-1}, Z_1^1, Z_2^{-2}, Z_2^0, Z_2^2, Z_3^{-3}, Z_3^{-1}, Z_3^1, Z_4^{-4}, Z_4^{-2}, Z_4^0, Z_4^2, Z_4^4$.

The decomposition allows coordinates in a basis defined by the polynomials in question to be obtained. When the decomposition is carried out using 15 polynomials, a vector $V_i$ of (15, 1) size is obtained. The elementary diffraction pattern $A_{0,i}$ is classified using the vector resulting from the decomposition. When a decomposition of the modulus and phase of the elementary diffraction pattern $A_u$ is performed, a vector $V_i$ of (30, 1) size is obtained.

A term representing a dimension or, more generally, a geometric parameter of the particle of interest may be added to the vector resulting from the decomposition into the basis of polynomials. By geometric parameter, what is meant is a perimeter, a radius or diameter, an area, an eccentricity, or a volume estimated on the basis of area. The geometric parameter of the particle may be obtained in light of the complex image $A_{10}$ reconstructed in the plane of the sample, in step 120, or of an observation image $I_{10}$ obtained from the reconstructed complex image. In the example given with reference to FIGS. 3A to 3F, a dimension of the particle of interest has been estimated from the image of the modulus of the extracted complex image $A_{10,i}$ shown in FIG. 3D.

It is also possible to add, to the vector resulting from the decomposition into the basis of polynomials, an optical characteristic, for example an absorbance level, or a refractive-index or diffractive-power value.

The elementary diffraction pattern $A_{0,i}$, or its projection, whether it be a radial average or a basis of polynomials, may be compared to diffraction patterns obtained experimentally using known calibration particles. It may also be compared to diffraction patterns obtained by numerical modeling. According to such an embodiment, a database containing modeled diffraction patterns is created. To do this, a plurality of values of parameters of a particle are taken into account.

Next, a diffraction pattern obtained in the detection plane is modeled by numerical modeling. Such modeling may notably be based on Mie theory. Mie theory is a model of elastic scattering allowing a solution to Maxwell's equations to be obtained that describes a light wave diffracted by a spherical particle illuminated by a monochromatic incident light wave of wavelength λ. Besides its spherical shape, the particle is characterized by a refractive index n, the latter notably being able to be a complex refractive index:

$n = \mathrm{Re}(n) + j\mathrm{Im}(n)$, with $j^2 = -1$. Re and Im are operators that return real part and imaginary part, respectively. The particle is also characterized by its size (radius or diameter).

When diffraction patterns modeled by Mie theory are used, it is preferable for the analyzed particles to be spherical, or to be made spherical by the addition of a spherizing agent.

According to one variant, parameters, and in particular the refractive index and the size, of the modeled particle are gradually adjusted so that the modeled diffraction pattern gradually approaches the elementary diffraction pattern corresponding to the particle of interest. The gradual adjustment may be achieved iteratively, by determining, in each iteration, a difference between the elementary diffraction pattern and a modeled diffraction pattern. The difference may be progressively reduced by implementing an algorithm of the gradient-descent type. This allows the modeling parameters to be gradually adjusted so as to gradually reduce the difference between the modeled diffraction pattern and the elementary diffraction pattern. The modeling parameters may be: size (radius or diameter), refractive index, and possibly the distance between the particle and the detection plane. The better the distance between the particle and the detection plane is known, the more precisely the elementary diffraction pattern will be reconstructed.

In FIG. 4, for a particle with a radius of 2.59 μm and a refractive index of 1.43, a curve (curve b) corresponding to a radial average of the modulus of an elementary diffraction pattern simulated by Mie theory has been shown. This illustrates the ability to characterize a particle of interest, on the basis of modeled elementary diffraction patterns.

Moreover, being able to model an elementary diffraction pattern allows various particles, with various parameters (in particular with various sizes and refractive indices) to be modeled. This also allows interpolations between modeled elementary diffraction patterns having two different values of the same parameter.

An elementary diffraction pattern obtained for a particle of interest may be classified using an algorithm of SVM type (SVM being the acronym of Support Vector Machine), after a training phase carried out on the basis of modeled diffraction patterns. Other classification algorithms, in particular supervised classification algorithms, and for example by PCA algorithms (PCA being the acronym of Principal Component Analysis), may also be applied.

It may also be envisioned to use modeled diffraction patterns in the characterization via decomposition into a basis of polynomials.

The inventors have implemented a method as described above to characterize blood particles, in the present case red blood cells. Each sample consisted of blood diluted to $\frac{1}{600}^{th}$ in a spherizing reagent. The concentration of red blood cells, before dilution, was $2.41 \times 10^6$ red blood cells per mm³. The average blood-cell volume was 92 μm³. The sample spanned a range of distances comprised between 1050 and 1200 μm with respect to the image sensor. Steps 100 to 150 described above were applied. 1000 particles of interest, each of which corresponded to one red blood cell, were detected. Using complex images reconstructed at various distances, a distance $z_i$ of each particle of interest with respect to the detection plane was estimated. One elementary diffraction pattern $A_{0,i}$ was formed for each particle of interest, taking into account the distance associated therewith.

A radial profile forming a radial average of each elementary diffraction pattern, such as the profile described with reference to FIG. 4, was then determined. An adjustment algorithm was implemented, so as to gradually determine the parameters of a spherical particle, the radial profile of which (i.e. the profile obtained from the modeled diffraction pattern in the detection plane) was similar to the radial profile of the elementary diffraction pattern.

The inventors have established a relationship between the refractive index, at 405 nm, and the hemoglobin concentration of a particle. In the modeling of the diffraction patterns, radius, refractive index (dependent on hemoglobin concentration) and distance with respect to the detection plane were considered.

FIG. 5A shows a distribution of the hemoglobin level of the particles (y-axis) as a function of the distance with respect to the detection plane (x-axis). The hemoglobin level is expressed in g/dL.

FIG. 5B shows a distribution of the radius of the particles (y-axis) as a function of the distance with respect to the detection plane (x-axis). The radius of the particles is expressed in µm.

FIG. 5C shows a histogram of the number of the particles (y-axis) as a function of the distance with respect to the detection plane (x-axis). The distance is expressed in µm.

The method described above was implemented on various types of blood particles (red blood cells, white blood cells, platelets) found in a blood sample purified in dextran. As previously indicated, dextran has the effect of causing an aggregation of red blood cells, this leading to a sedimentation of the latter. The supernatant plasma, which was depleted in red blood cells with respect to the initial blood, was collected. It was then diluted to $\frac{1}{10}^{th}$ in PBS buffer. During this trial, the concentration of white blood cells, red blood cells and platelets was $5.1 \times 10^3$ per mm$^3$, $0.02 \times 10^6$ per mm$^3$, and $198 \times 10^3$ per mm$^3$, respectively. For different particles of interest, elementary diffraction patterns were formed by implementing steps 100 to 150 described above. On the basis of each elementary diffraction pattern, a size and a refractive index were estimated, the latter depending on the hemoglobin level. In the case of white blood cells and platelets, which do not contain hemoglobin, this concentration was unimportant, but it is related to refractive index. In FIG. 5D, each characterized particle of interest is positioned in a coordinate system, the x-axis of which corresponds to radius (in µm) and the y-axis of which represents hemoglobin level. This allows red blood cells (set a), white blood cells (set b) and platelets (set c) to be identified.

In another trial, the inventors implemented the method as described above on various samples, containing various types of white blood cells (leukocytes), distributed between four classes:
  class 1: lymphocytes;
  class 2: monocytes;
  class 3: neutrophils;
  class 4: eosinophils.

Samples of purified blood were prepared and particles corresponding to white blood cells were characterized. In these samples, the red blood cells were lysed, and the blood was diluted to $\frac{1}{10}^{th}$ (dilution in a Whitediff lysis reagent—commercially available kit sold by Horiba). The characterization was carried out by implementing steps 100 to 150 described above, each isolated elementary diffraction pattern being obtained by decomposing modulus and phase images into Zernike polynomials, up to the order n=4. For each decomposition, 30 coordinates (15 for the modulus, 15 for the phase) were obtained. The diameter of each white blood cell was also determined, the latter being estimated from the complex image reconstructed in the plane of the sample, and more particularly from the modulus image. For each class, a database of diffraction patterns obtained experimentally from purified samples (a single type of white blood cell—or one class—being largely predominant in the sample >80%) was available. This database was used to train the classification. The classification was carried out using an SVM algorithm.

The following table shows the results of the classification. The classes associated with each row and with each column correspond to the real classes and to the classes determined by measurement, respectively. The classification performance was judged to be satisfactory.

TABLE 1

|   | 1   | 2   | 3   | 4   |
|---|-----|-----|-----|-----|
| 1 | 93% | 3%  | 6%  | <1% |
| 2 | 2%  | 77% | 10% | 3%  |
| 3 | 4%  | 14% | 80% | 8%  |
| 4 | 1%  | 6%  | 4%  | 89% |

Figure 6:
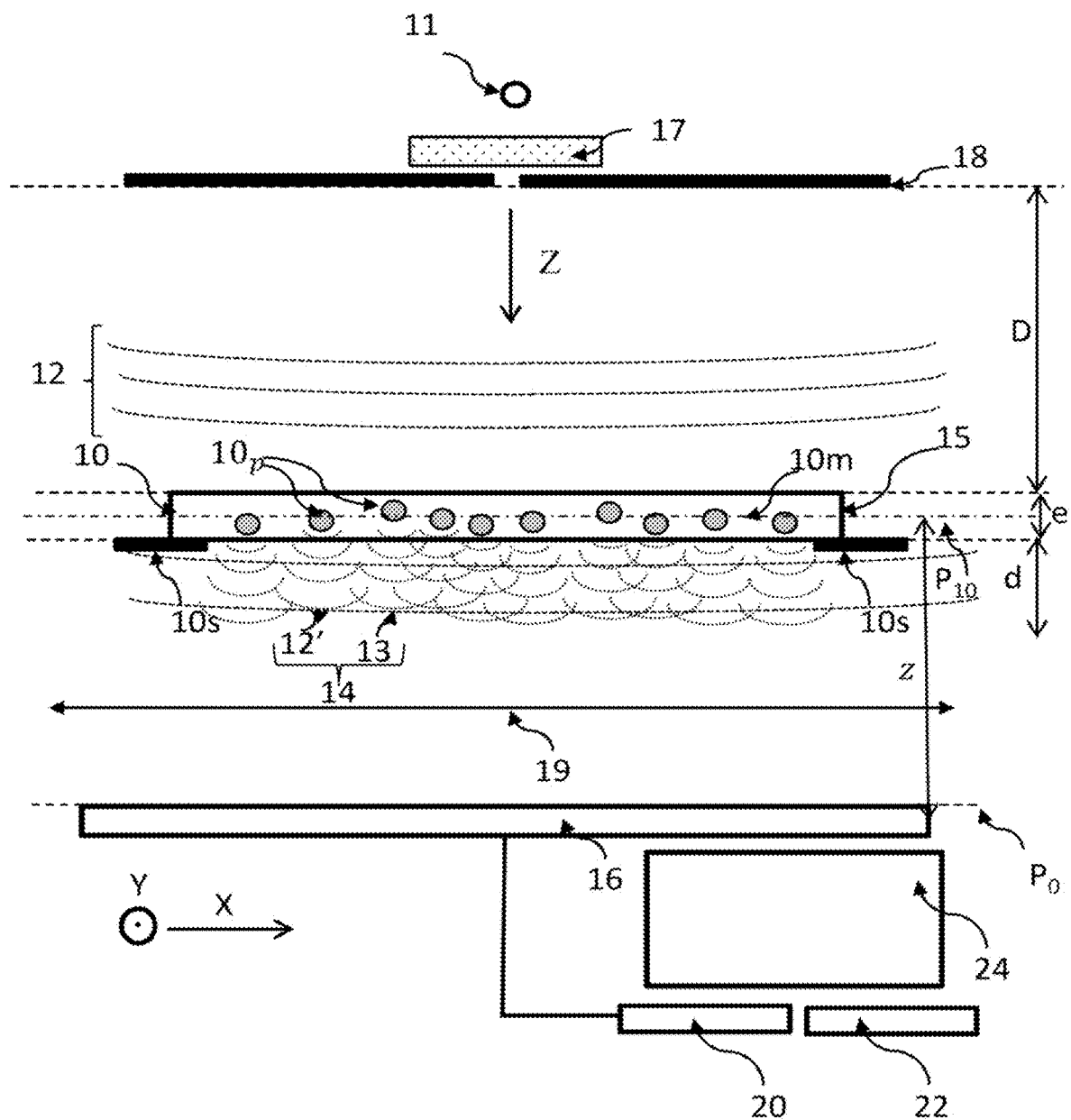
FIG. 6 shows another device allowing the invention to be implemented.

FIG. 6 schematically shows another device allowing the invention to be implemented. Unlike the device shown in FIG. 1, the device of FIG. 6 comprises an optical image-forming system 19. The optical system 19 defines an image plane and an object plane. The optical system may be a lens or an objective. During the acquisition of the image of the sample, the image sensor is placed in a defocused configuration. The detection plane is offset with respect to the image plane and/or the plane in which the sample lies is offset with respect to the object plane. The offset is generally small, preferably being smaller than 1 mm, and typically lying in a range 50 µm-500 µm.

The invention may be implemented on various types of samples, for example in the field of diagnostics, biology, or environmental monitoring, or in various industrial sectors, the food industry or process control for example.

The invention claimed is:

1. A method for characterizing a particle within a sample, the sample lying between an image sensor and a light source, the image sensor lying in a detection plane, the method comprising:
  a) illuminating the sample with the light source, the light source emitting an incident light wave that propagates along a propagation axis;
  b) acquiring an image of the sample with the image sensor, the image comprising a plurality of elementary diffraction patterns, each elementary diffraction pattern corresponding to one particle;
  c) on the basis of the acquired image, reconstructing a complex image representative of a complex amplitude of the exposure light wave on at least one reconstruction surface passing through the sample, the reconstruction being achieved by implementing an iterative reconstruction algorithm, the algorithm comprising, in each iteration, updating a phase of the exposure light wave in the detection plane or on the reconstruction surface;

d) selecting a region of interest of the complex image, the selected region of interest corresponding to a selected particle of interest;

e) forming an extracted complex image, the extracted complex image being extracted from the region of interest of the complex image selected in d);

f) applying a propagation operator to the extracted complex image formed in e), so as to obtain, in at least one propagation plane, an elementary diffraction pattern of the particle of interest selected in d), such that the elementary diffraction pattern obtained is isolated from elementary diffraction patterns of other particles present in the sample, the elementary diffraction pattern comprising interference fringes; and g) characterizing the particle of interest depending on the elementary diffraction pattern resulting from f), wherein g) comprises at least one of:

comparing the elementary diffraction pattern obtained in f), with at least one diffraction pattern corresponding to a known particle;

comparing the elementary diffraction pattern obtained in f), with at least one diffraction pattern modeled in view of a particle the refractive index and/or size of which are known; and classifying the elementary diffraction pattern obtained in f), in view of diffraction patterns obtained using known particles or diffraction patterns modeled in a training phase.

2. The method of claim 1, wherein, in f), the propagation plane is the detection plane.

3. The method of claim 1, wherein:

c) comprises, in each iteration, applying a holographic propagation operator to an image of the exposure light wave, in the detection plane, so as to obtain a complex expression for the exposure light wave, in at least one plane in which the sample lies, forming the complex image; and d) comprises, on the basis of the reconstructed complex image, obtaining an observation image, the particle of interest being selected in the observation image.

4. The method of claim 1, wherein f) comprises applying a holographic propagation operator to the region of interest selected in d), so as to obtain the elementary diffraction pattern, corresponding to the particle of interest, in the propagation plane, the portion of the reconstructed complex image located outside the region of interest not being propagated.

5. The method of claim 1, comprising estimating a distance between the particle of interest and the detection plane, such that, in f), the propagation operator takes into account the distance thus estimated.

6. The method of claim 1, wherein, in f), the propagation is carried out in view of a predetermined propagation distance.

7. The method of claim 1, wherein, in f), the elementary diffraction pattern is a complex elementary diffraction pattern, in the reconstruction plane, of the particle selected in c).

8. The method of claim 7, wherein, in g), the characterization is carried out on a basis of a phase or of a modulus of the elementary diffraction pattern, or of a real part of the elementary diffraction pattern or of an imaginary part of the elementary diffraction pattern.

9. The method of claim 1, wherein g) comprises determining an axial profile, representing a radial average of the elementary diffraction pattern.

10. The method of claim 1, wherein g) comprises:

decomposing the elementary diffraction pattern into a basis of Zernike polynomials, so as to obtain coordinates of the elementary diffraction pattern in the basis; and characterizing the particle of interest depending on the coordinates of the elementary diffraction pattern.

11. The method of claim 1, wherein g) comprises characterizing the particle of interest depending on modeled diffraction patterns, each diffraction pattern corresponding to one particle a parameter of which is known, the parameter being at least one of a size and a refractive index; and the characterizing determines a value of the parameter for the particle of interest.

12. The method of claim 11, comprising iteratively adjusting the parameter of the particle of interest, each iteration comprising:

i) taking into account a parameter or a set of parameters of the particle of interest;

ii) obtaining a modeled diffraction pattern dependent on the parameter or the set of parameters taken into account;

iii) determining a difference between the modeled diffraction pattern and the elementary diffraction pattern resulting from f); and iv) estimating a parameter, or a set of parameters which will decrease the difference thus determined, the estimated parameter or set of parameters being taken into account in a following iteration.

13. The method of claim 12, comprising, in i) to iv), taking into account the set of parameters, the set of parameters comprising a distance between the particle of interest and the detection plane.

14. A device for observing a sample, the sample containing particles, the device comprising:

a light source, configured to illuminate the sample;

a sample holder, configured to receive the sample;

an image sensor, placed such that when the sample is placed on the holder, the sample lies between the image sensor and the light source, the image sensor being configured to acquire an image of the sample; and a processor, configured to implement c) to g) of the method recited in claim 1, on a basis of an image acquired by the image sensor.

15. The device of claim 14, wherein no image-forming optic is placed between the image sensor and the sample.

16. The device of claim 14, comprising:

an optical system lying between the sample and the image sensor, the optical system defining an image plane and an object plane; and means for adjusting one of the optical system, the sample, and the image sensor, wherein at least one of:

the detection plane is offset from the image plane, and the object plane is offset from a sample plane in which the sample lies.

17. The method of claim 1, wherein the extracted complex image, formed in e):

comprises the selected region of interest corresponding to the selected particle; and does not comprise any region of interest corresponding to other particles than the selected particle, so that the elementary diffraction pattern obtained is isolated from elementary diffraction patterns of other particles present in the sample.

* * * * *